(12) United States Patent
Ooms et al.

(10) Patent No.: US 6,528,616 B1
(45) Date of Patent: Mar. 4, 2003

(54) DOUBLE METAL CYANIDE CATALYSTS FOR THE PRODUCTION OF POLYTHER POLYOLS

(75) Inventors: Pieter Ooms, Krefeld (DE); Jörg Hofmann, Krefeld (DE); Pramod Gupta, Bedburg (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 10/030,771

(22) PCT Filed: Apr. 20, 2000

(86) PCT No.: PCT/EP00/03619

§ 371 (c)(1),
(2), (4) Date: Oct. 29, 2001

(87) PCT Pub. No.: WO00/68295

PCT Pub. Date: Nov. 16, 2000

(30) Foreign Application Priority Data

May 5, 1999 (DE) .......................................... 199 20 552
May 28, 1999 (DE) .......................................... 199 24 672

(51) Int. Cl.$^7$ .......................... B01J 27/26; C08G 59/00
(52) U.S. Cl. ....................... 528/405; 528/403; 528/408; 528/409; 528/410; 528/414; 528/415; 528/417; 526/617; 526/623; 526/624; 502/175; 502/200
(58) Field of Search ................................ 502/175, 200; 528/403, 405, 408, 409, 410, 414, 415, 417; 526/617, 623, 624

(56) References Cited

U.S. PATENT DOCUMENTS

| | | | |
|---|---|---|---|
| 3,404,109 A | 10/1968 | Milgrom | 260/611 |
| 3,829,505 A | 8/1974 | Herold | 260/611 B |
| 3,900,518 A | 8/1975 | Sasada | 427/390 |
| 3,941,849 A | 3/1976 | Herold | 260/607 A |
| 5,158,922 A | 10/1992 | Hinney et al. | 502/175 |
| 5,470,813 A | 11/1995 | Le-Khac | 502/175 |
| 5,482,908 A | 1/1996 | Le-Khac | 502/156 |
| 5,545,601 A | 8/1996 | Le-Khac | 502/156 |
| 5,627,120 A | 5/1997 | Le-Khac | 502/156 |
| 5,637,673 A | 6/1997 | Le-Khac | 528/405 |
| 5,714,428 A | 2/1998 | Le-Khac | 502/159 |

FOREIGN PATENT DOCUMENTS

JP    4-145123    5/1992

OTHER PUBLICATIONS

Kunststoffhandbuch vol. 7. Polyurethane, 3$^{rd}$ edition (month unavailable) 1993 pp. 57–67.
Rohstoffe, Prof Dr. W. Diller, Dr. P. Gupta, Dr. p. Haas, Dr. K. Schauerte, Dr. R. Sundermann, Dr. K. Uhlig.
Ullmanns Encyclopedia of Industrial Chemistry vol. A 21, (month unavailable) 1992, pp. 670–671 Polyurethanes.
Ullmanns Encyclopedia of Industrial Chemistry vol. A 1, pp. 161–172 (month unavailable) 1995, Acrylic Acid and Derivatives, Takashi, Ohara, Takahisa Sato.
Kunststoffhandbuch vol. 7. Polyurethane, 3$^{rd}$ Edition (month unavailable) 1993 pp. 25–35.
Rompp Lexikon Chemie, vol. 4, 10th edition (month unavailable) 1996.
Kirk–Othmer: Encyclopedia of Chem. Technology, 1991, (month unavailable) pp. 291–293.
Rompp Lexikon Chemie, vol. 4, 10th edition (date unavailable) p. 2629.

*Primary Examiner*—Elizabeth D. Wood
(74) *Attorney, Agent, or Firm*—Joseph C. Gil; John E. Mrozinski, Jr.

(57) ABSTRACT

The invention relates to new double metal cyanide (DMC) catalysts for the production of polyether polyols by polyaddition of alkylene oxides to starter compounds containing active hydrogen atoms, wherein the catalyst contains a) double metal cyanide compounds, b) organic complex ligands different from c), and c) α,β-unsaturated carboxylic acid esters. The catalysts according to the invention have a significantly improved activity in the production of polyether polyols.

9 Claims, No Drawings

DOUBLE METAL CYANIDE CATALYSTS FOR THE PRODUCTION OF POLYTHER POLYOLS

The present invention relates to new double metal cyanide (DMC) catalysts for the production of polyether polyols by polyaddition of alkylene oxides to starter compounds containing active hydrogen atoms.

Double metal cyanide (DMC) catalysts for the polyaddition of alkylene oxides to starter compounds containing active hydrogen atoms are known (see for example U.S. Pat. Nos. 3,404,109, 3,829,505, 3,941,849 and 5,158,922). The use of these DMC catalysts for the production of polyether polyols lead in particular to a reduction of the proportion of monofunctional polyethers with terminal double bonds, so-called monools, compared to the conventional production of polyether polyols by means of alkali metal catalysts such as alkali metal hydroxides. The polyether polyols that are thus obtained may be processed into high-grade polyurethanes (for example elastomers, foams, coatings). DMC catalysts are normally obtained by reacting an aqueous solution of a metal salt with an aqueous solution of a metal cyanide salt in the presence of an organic complex ligand, e.g. an ether. In a typical catalyst preparation aqueous solutions of zinc chloride (in excess) and potassium hexacyanocobaltate for example are mixed and then dimethoxyethane (glyme) is added to the resultant suspension. After filtration and washing the catalyst with aqueous glyme solution, an active catalyst of the general formula

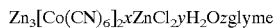

$$Zn_3[Co(CN)_6]_2 \cdot xZnCl_2 \cdot yH_2O \cdot z\,glyme$$

is obtained (see e.g. EP-A 700 949).

From JP-A 4 145 123, U.S. Pat. No. 5,470,813, EP-A 700 949, EP-A 743 093, EP-A 761 708 and WO 97/40086 DMC catalysts are known, which by using tert.-butanol as organic complex ligand (alone or in combination with a polyether (EP-A 700 949, EP-A 761 708, WO 97/40086)) further reduce the proportion of monofunctional polyethers with terminal double bonds in the production of polyether polyols.

Furthermore, the induction time in the polyaddition reaction of alkylene oxides with corresponding starter compounds is reduced and the catalyst activity is raised by the use of these DMC catalysts.

The object of the present invention was to provide further improved DMC catalysts for the polyaddition of alkylene oxides to corresponding starter compounds that have an increased catalyst activity compared to the hitherto known types of catalyst. Due to the reduction of the alkoxylation times this leads to an improved economy of the production process for polyether polyols. Ideally, due to its increased activity the catalyst can then be used in such low concentrations (25 ppm or less) that the very complicated and costly separation of the catalyst from the product is no longer necessary and the product can be used directly for producing polyurethanes.

It has now surprisingly been found that DMC catalysts that contain an $\alpha,\beta$-unsaturated carboxylic acid ester as complex ligand have a greatly increased activity in the production of polyether polyols.

The present invention accordingly provides a double metal cyanide (DMC) catalyst containing a) one or more, preferably one double metal cyanide compound, b) one or more, preferably one organic complex ligand different from c), and c) one or more, preferably one $\alpha,\beta$-unsaturated carboxylic acid ester.

The catalyst according to the invention may optionally contain d) water, preferably in an amount of 1 to 10 wt. %, and/or e) one or more water-soluble metal salts, preferably in an amount of 5 to 25 wt. %, of the formula (I) $M(X)_n$ from the production of the double metal cyanide compounds a). In formula (I) M is selected from the metals Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III).

Particularly preferred are Zn(II), Fe(II), Co(II) and Ni(II). X, which are identical or different, preferably identical, denote an anion preferably selected from the group comprising halides, hydroxides, sulfates, carbonates, cyanates, thiocyanates, isocyanates, isothiocyanates, carboxylates, oxalates or nitrates. The value of n is 1, 2 or 3.

The double metal cyanide compounds a) contained in the catalysts according to the invention are the reaction products of water-soluble metal salts and water-soluble metal cyanide salts.

Water-soluble metal salts suitable for the production of double metal cyanide compounds a) preferably have the general formula (I) $M(X)_n$, wherein M is selected from the metals Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). Particularly preferred are Zn(II), Fe(II), Co(II) and Ni(II). The anions X are identical or different, preferably identical, and are preferably selected from the group comprising halides, hydroxides, sulfates, carbonates, cyanates, thiocyanates, isocyanates, isothiocyanates, carboxylates, oxalates or nitrates. The value of n is 1, 2 or 3.

Examples of suitable water-soluble soluble metal salts are zinc chloride, zinc bromide, zinc acetate, zinc actetylacetonate, zinc benzoate, zinc nitrate, iron(II) sulfate, iron(II)bromide, iron(II)chloride, cobalt(II)chloride, cobalt (II)thiocyanate, nickel(II)chloride and nickel(II)nitrate. Mixtures of various water-soluble soluble metal salts may also be used.

Water-soluble soluble metal cyanide salts suitable for the production of double metal cyanide compounds a) preferably have the general formula (II) $(Y)_a M'(CN)_b (A)_c$, wherein M' is selected from the metals Fe(II), Fe(III), Co(III), Co(II), Cr(II), Cr(III), Mn(II), Mn(III), Ir(II), Ni(II), Rh(III), Ru(II), V(IV) and V(V). Particularly preferably M' is selected from the metals Co(II), Co(III), Fe(II), Fe(III), Cr(III), Ir(III) and Ni(II). The water-soluble soluble metal cyanide salt may contain one or more of these metals. The cations Y are identical or different, preferably identical, and are selected from the group comprising alkali metal ions and alkaline earth metal ions. The anions A are identical or different, preferably identical, and are selected from the group comprising halides, hydroxides, sulfates, carbonates, cyanates, thiocyanates, isocyanates, isothiocyanates, carboxylates, oxalates or nitrates a as well as b and c are integers, the values for a, b and c being chosen so as to ensure the electroneutrality of the metal cyanide salt; a is preferably 1, 2, 3 or 4; b is preferably 4, 5 or 6; c preferably has the value 0. Examples of suitable water-soluble metal cyanide salts are potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds a) that are contained in the catalysts according to the invention are compounds of the general formula (III)

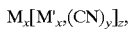

wherein
M is defined as in formula (I) and
M' is defined as in formula (II), and
x, x', y and z are integers and are selected so as to ensure the electroneutrality of the double metal cyanide compound.
Preferably
x=3, x'=1, y=6 and z=2,
M=Zn (II), Fe (II), Co (H) or Ni (II) and
M'=Co (III), Fe (III), Cr (III) or Ir (III).

Examples of suitable double metal cyanide compounds a) are zinc hexacyanocobaltate(III), zinc hexacyanoiridate(III), zinc hexacyanoferrate(III) and cobalt(II)hexacyanocobaltate (III). Further examples of suitable double metal cyanide compounds may be found for example in U.S. Pat. No. 5,158,922. It is particularly preferred to use zinc hexacyanocobaltate(III).

The organic complex ligands b) contained in the DMC catalysts according to the invention are in principle known and are described in detail in the prior art (for example in U.S. Pat. Nos. 5,158,922, 3,404,109, 3,829,505, 3,941,849, EP-A 700 949, EP-A 761 708, JP-A 4 145 123, U.S. Pat. No. 5,470,813, EP-A 743 093, and WO 97/40086). Preferred organic complex ligands are water-soluble organic compounds with heteroatoms such as oxygen, nitrogen, phosphorus or sulfur, that can form complexes with the double metal cyanide compound a). Suitable organic complex ligands are for example alcohols, aldehydes, ketones, ethers, esters, amides, ureas, nitrites, sulfides and mixtures thereof. Preferred organic complex ligands are water-soluble aliphatic alcohols such as ethanol, isopropanol, n-butanol, iso-butanol, sec.-butanol and tert.-butanol. Tert-butanol is particularly preferred.

The organic complex ligand is added either during the catalyst preparation or immediately after the precipitation of the double metal cyanide compound a). The organic complex ligand is normally used in excess.

The DMC catalysts according to the invention contain the double metal cyanide compounds a) in amounts of 20 to 90 wt. %, preferably 25 to 80 wt. %, referred to the amount of finished catalyst, and the organic complex ligands b) in amounts of 0.5 to 30 wt. %, preferably 1 to 25 wt. %, referred to the amount of the finished catalyst. The DMC catalysts according to the invention normally contain 1 to 80 wt. %, preferably 1 to 40 wt. %, referred to the amount of the finished catalyst, of α,β-unsaturated carboxylic acid esters c).

Suitable α,β-unsaturated carboxylic acid esters c) for the production of the catalysts according to the invention are for example mono-, di-, tri- or polyesters of acrylic acid and alkyl-, alkoxy-, alkoxycarbonyl- and alkoxycarbonylalkylacrylic acids with alcohols containing 1 to 30 C atoms or polyether polyols.

Suitable as alcohol component are monohydric, dihydric, trihydric or polyhydric aryl, aralkyl, alkoxyalkyl and alkyl alcohols with 1 to 30 C atoms, preferably 1 to 24 C atoms, particularly preferably 1 to 20 C atoms; preferred are aralkyl, alkoxyalkyl and alkyl alcohols, alkoxyalkyl and alkyl alcohols being particularly preferred.

Also suitable as alcohol component are polyalkylene glycols and polyalkylene glycol ethers, preferably polypropylene glycols and polyethylene glycols or their ethers with molecular weights of 200 to 10000, preferably 300 to 9000, particularly preferably 400 to 8000.

Suitable as α,β-unsaturated carboxylic acids are acrylic acid and alkyl-, alkoxy- and alkoxycarbonylalkylacrylic acids with 1 to 20 C atoms, such as 2-methylacrylic acid (methacrylic acid), 3-methylacrylic acid (crotonic acid), trans-2,3-dimethylacrylic acid (tiglic acid), 3,3-dimethylacrylic acid (seneciocic acid) or 3-methoxyacrylic acid; preferred are acrylic acid, 2-methylacrylic acid, 3-methylacrylic acid and 3-methoxyacrylic acid; and particularly preferred are acrylic acid and 2-methylacrylic acid.

The α,β-unsaturated carboxylic acid esters used for the production of the catalysts according to the invention are as a rule obtained by esterification of mono-, di-, tri-, tetra- or polyhydroxy compounds with 1 to 30 C atoms, such as methanol, ethanol, ethanediol (ethylene glycol), 1-propanol, 2-propanol, 1,2-propanediol, 1,3-propanediol, 1,2,3-propanetriol(glycerol), butanol, 2-butanol, i-butanol, 1,2-butanediol, 1,3-butanediol, 2,3-butanediol, 1,4-butanediol, 1,2,3-butanetriol, 1-pentanol, 1-hexanol, 1-heptanol, 1-octanol, 1-nonanol, 1-decanol, 1-dodecanol, 1-tridecanol, 1-tetradecanol, 1-hexadecanol, 1-heptadecanol, 9-octadecanol, 1,1,1-tris(hydroxymethyl)propane, pentaerythritol, methoxymethanol, ethoxymethanol, propoxymethanol, butoxymethanol, 2-ethoxyethanol, 2-propoxyethanol, 2-butoxy-ethanol, hydroxyacetic acid methyl ester, hydroxyacetic acid ethyl ester, hydroxyacetic acid propyl ester, hydroxypropionic acid methyl ester, hydroxypropionic acid ethyl ester, hydroxypropionic acid propyl ester or polyether polyols such as polyethylene glycols and polypropylene glycols with the corresponding (α,β-unsaturated carboxylic acids, optionally in the presence of catalysts.

Preferred are mono-, di- and triesters of acrylic acid and methacrylic acid with ethanediol, 1,2-propanediol, 1,3-propanediol, 1,4-butanediol, 1,6-hexanediol, 1,2,3-propanetriol(glycerol), 1,1,1-tris-(hydroxymethyl)propane, 1,1,1-tris-(hydroxymethyl)propane-ethoxylates, 1,1,1-tris-(hydroxymethyl)propane-propoxylates, polyethylene glycols and polypropylene glycols.

Particularly preferred α,β-unsaturated carboxylic acid esters are polyethylene glycol acrylic acid esters, polyethylene glycol diacrylic acid esters, polyethylene glycol methacrylic acid esters, polyethylene glycol dimethacrylic acid esters, polypropylene glycol acrylic acid esters, polypropylene glycol diacrylic acid esters, polypropylene glycol methacrylic acid esters, polypropylene glycol dimethacrylic acid esters, 1,2,3-propanetriol diacrylic acid esters, 1,2,3-propanetriol dimethacrylic acid esters, 1,2,3-propanetriol triacrylic acid esters, 1,2,3-propanetriol-1,3-(2-hydroxypropoxylate) diacrylic acid esters, 1,2,3-propanetriol-propoxylate triacrylic acid esters, 1,4-butanediol acrylic acid esters, 1,4-butanediol dimethacrylic acid esters, 1,6-hexanediol diacrylic acid esters, 2-hydroxypropyl methacrylic acid esters, 1,1,1-tris(hydroxymethyl)propane triacrylic acid esters, 1,1,1,-tris(hydroxymethyl)propane-ethoxylate triacrylic acid esters, 1,1,1-tris(hydroxymethyl)propane-ethoxylate trimethacrylic acid esters, 1,1,1-tris(hydroxymethyl)propane-propoxylate triacrylic acid esters or 1,1,1-tris(hydroxymethyl)propane-propoxylate trimethacrylic acid esters.

Methods for the production of α,β-unsaturated carboxylic acid esters are generally well known and are described in detail for example in "Kirk-Othmer: Encyclcopedia of Chemical Technology", Vol. 1, 4$^{th}$ Edition 1991, p. 291 et seq.; "Römpp: Lexikon Chemie", Vol. 1, 10$^{th}$ Edition, Stuttgart/New York 1996, p. 49. Vol, 4, 10$^{th}$ Edition, Stuttgart/New York 1998. p. 2629 et seq.; "Ullmanns Encyclopedia of Industrial Chemistry", Vol. A1, 5$^{th}$ Edition, 1995, p. 161 et seq.

Arbitrary mixtures of the aforementioned α,β-unsaturated carboxylic acid esters may also be used.

The analysis of the catalyst composition is normally performed by means of elementary analysis, thermogravimetry or extractive removal of the α,β-unsaturated carboxylic acid ester fraction followed by gravimetric determination.

The catalysts according to the invention may be crystalline, partially crystalline or amorphous. The analysis of the crystallinity is normally carried out by powder X-ray diffractometry.

Preferred are catalysts according to the invention containing a) zinc hexacyanocobaltate (III),
b) tert.-butanol, and
c) an α,β-unsaturated carboxylic acid ester.

The production of the DMC catalysts according to the invention is normally carried out in aqueous solution by reacting α) metal salts, in particular of the formula (I), with metal cyanide salts, in particular of the formula (II), β) organic complex ligands b) that are different from the α,β-unsaturated carboxylic acid esters, and γ) α,β-unsaturated carboxylic acid esters.

Preferably first of all the aqueous solutions of the metal salt (e.g. zinc chloride, used in stoichiometric excess (at least 50 mole % referred to the metal cyanide salt)) and of the metal cyanide salt (e.g. potassium hexacyanocobaltate) are reacted in the presence of the organic complex ligand b) (e.g. tert.-butanol), a suspension being formed that contains the double metal cyanide compound a) (e.g. zinc hexacyanocobaltate), water d), excess metal salt e), and the organic complex ligand b).

The organic complex ligand b) may be present in the aqueous solution of the metal salt and/or of the metal cyanide salt, or it may be added directly to the suspension obtained after precipitation of the double metal cyanide compound a). It has proved advantageous to mix the aqueous solutions and the organic complex ligand b) while stirring vigorously. The suspension that is formed is then normally treated with the α,β-unsaturated carboxylic acid ester c). The α,β-unsaturated carboxylic acid ester c) is preferably used in a mixture with water and organic complex ligand b).

The catalyst is then removed from the suspension by known techniques such as centrifugation or filtration. In a preferred variant the separated catalyst is then washed with an aqueous solution of the organic complex ligand b) (e.g. by re-suspension followed by renewed separation by filtration or centrifugation). In this way for example water-soluble byproducts such as potassium chloride may be removed from the catalyst according to the invention.

Preferably the amount of organic complex ligand b) in the aqueous wash solution is between 40 and 80 wt. % referred to the total solution. Furthermore, it is advantageous to add to the aqueous wash solution some α,β-unsaturated carboxylic acid ester, preferably in an amount of between 0.5 and 5 wt. % referred to the total solution.

It is furthermore advantageous to wash the catalyst more than once. For this purpose the first wash procedure for example may be repeated. It is preferred however to use non-aqueous solutions for further wash procedures, e.g. a mixture of organic complex ligand and the α,β-unsaturated carboxylic acid ester.

The washed catalyst is then, optionally after it has been ground, dried at temperatures of in general 20°–100° C. and at pressures of in general 0.1 mbar to normal pressure (1013 mbar).

The present invention also provides for the use of the DMC catalysts according to the invention in a process for the production of polyether polyols by polyaddition of alkylene oxides to starter compounds containing active hydrogen atoms.

As alkylene oxides there are preferably used ethylene oxide, propylene oxide, butylene oxide as well as their mixtures. The build-up of the polyether chains by alkoxylation may be carried out for example using only one monomeric epoxide, or may also be effected in a statistical or blockwise distribution with 2 or 3 different monomeric epoxides. Further details may be found in "Ullmanns Encyclopädie der industriellen Chemie". Vol. A21. 1992. p. 670 et seq.

As starter compounds containing active hydrogen atoms there are preferably used compounds with molecular weights (number average) of 18 to 2,000 and containing 1 to 8 hydroxyl groups. The following may be mentioned by way of example: ethylene glycol, diethylene glycol, triethylene glycol, 1,2-propylene glycol, 1,4-butanediol, hexamethylene glycol, bisphenol A, trimethylolpropane, glycerol, pentaerythritol, sorbitol, raw sugar, degraded starch or water.

Preferably such starter compounds containing active hydrogen atoms are used that have been produced for example by conventional alkali catalysis from the aforementioned low molecular weight starter compound and that form oligomeric alkoxylation products faith molecular weights (number average molecular weight) of 200 to 2000.

The polyaddition of alkylene oxides to starter compounds containing active hydrogen atoms that is catalysed by the catalysts according to the invention is generally carried out at temperatures of 20° to 200° C., preferably in the range from 40° to 180° C. particularly preferably at temperatures of 50° to 150° C. The reaction may be carried out at total pressures of 0.001 to 20 bar. The polyaddition may be carried out in bulk or in an inert organic solvent such as toluene and/or THF. The amount of solvent is normally 10 to 30 wt. %, referred to the amount of polyether polyol to be produced.

The catalyst concentration is chosen so as to ensure a good control of the polyaddition reaction under the given reaction conditions. The catalyst concentration is generally in the range from 0.0005 wt. % to 1 wt. %, preferably in the range from 0.001 wt. % to 0.1 wt. %, particularly preferably in the range from 0.001 to 0.0025 wt. %, referred to the amount of polyether polyol to be produced.

The molecular weights (number average molecular weight) of the polyether polyols produced by the process according to the invention are in the range from 500 to 100,000 g/mole, preferably in the range from 1,000 to 50,000 gimole, particularly preferably in the range from 2,000 to 20,000 g/mole.

The polyaddition may be carried out continuously or batchwise, for example in a batch process or in a semi-batch process.

On account of their significantly improved activity, the catalysts according to the invention may be used in very low concentrations (25 ppm and less, referred to the amount of the polyether polyol to be produced). If the polyether polyols produced in the presence of the catalysts according to the invention are used for the production of polyurethanes (Kunststoffhandbuch, Vol. 7, Polyurethanes, 3$^{rd}$ Edition, 1993, pp. 25–32 and 57–67), removal of the catalyst from the polyether polyol can be omitted without adversely affecting the product qualities of the polyurethane that is obtained.

EXAMPLES

Catalyst Preparation

Example A

Preparation of a DMC Catalyst with Polyethylene Glycol Diacrylic Acid Ester (Catalyst A)

A solution of 12.5 g (91.5 mmole) of zinc chloride in 20 ml of distilled water is added while stirring vigorously (24,000 revs/min) to a solution of 4 g (12 mmole) of potassium hexacyanocobaltate in 70 ml of distilled water. Immediately thereafter a mixture of 50 g of tert.-butanol and 50 g of distilled water is added to the resultant suspension and the whole is then stirred vigorously for 10 minutes (24,000 revs/min). A mixture of 1 g of polyethylene glycol diacrylic acid ester (Sigma Aldrich Chemie GmbH, D-89552 Steinheim) with a number-average molecular weight of 575, 1 g of tert.-butanol and 100 g of distilled water is then added and the whole is stirred for 3 minutes (1,000 revs/min). The solids are removed by filtration, then stirred (10,000 revs/min) for 10 minutes with a mixture of 70 g of tert.-butanol, 30 g of distilled water and 1 g of the above polyethylene glycol diacrylic acid ester, and refiltered. The product is then stirred (10,000 revs/min) once more for 10 minutes with a mixture of 100 g of tert.-butanol and 0.5 g of the above polyethylene glycol diacrylic acid ester. After filtration the catalyst is dried at 50° C. and under normal pressure to constant weight.

Yield of dried, pulverulent catalyst: 5.4 g

Elementary analysis, thermogravimetric analysis and extraction: cobalt=10.9 wt. %, zinc=22.8 wt. %, tert.-butanol=6.2 wt. %, polyethylene glycol diacrylic acid ester=19.5 wt. %

Example B

Preparation of a DMC Catalyst with Polyethylene Glycol Dimethacrylic Acid Ester (Catalyst B)

The process described in Example A was used except that a polyethylene glycol dimethacrylic acid ester with a molecular weight (number average) of 875 (Sigma Aldrich Chemie GmbH, D-89552 Steinheim) was used instead of the polyethylene glycol diacrylic acid ester of Example A.

Yield of dried, pulverulent catalyst: 5.4 g

Elementary analysis, thermogravimetric analysis and extraction: cobalt=11.2 wt. %, zinc=24.3 wt. %, tert.-butanol=4.9 wt. %, polyethylene glycol dimethacrylic acid ester=18.5 wt. %

Example C

Preparation of a DMC Catalyst with Polypropylene Glycol Methacrylic Acid Ester (Catalyst C)

The process described in Example A was used except that a polypropylene glycol methacrylic acid ester with a molecular weight (number average) of 375 (Sigma Aldrich Chemie GmbH, D-89552 Steinheim) was used instead of the polyethylene glycol diacrylic acid ester of Example A.

Yield of dried, pulverulent catalyst: 6.2 g

Elementary analysis, thermogravimetric analysis and extraction: cobalt=10.2 wt. %, zinc=23.9 wt. %, tert.-butanol=6.6 wt. %, polypropylene glycol methacrylic acid ester=20.6 wt. %

Example D

Preparation of a DMC Catalyst with 1,6-hexanediol Dimethacrylic Acid Ester (Catalyst D)

The process described in Example A was used except that 1,6-hexanediol dimethacrylic acid ester was used instead of the polyethylene glycol diacrylic acid ester of Example A.

Yield of dried, pulverulent catalyst: 5.5 g

Elementary analysis, thermogravimetric analysis and extraction: cobalt=10.0 wt. %, zinc=23.3 wt. %, tert.-butanol=10.2 wt. %, 1,6-hexanediol dimethacrylic acid ester=15.5 wt. %

Example E

Preparation of a DMC catalyst with 1,1,1-tris (hydroxymethyl)propane triacrylic acid ester (Catalyst E)

The process described in Example A was used except that 1,1,1-tris(hydroxymethyl)propane triacrylic acid ester was used instead of the polyethylene glycol diacrylic acid ester of Example A.

Yield of dried, pulverulent catalyst: 5.0 g

Elementary analysis, thermogravimetric analysis and extraction: cobalt=1.8 wt. %, zinc=27.7 yl.%, tert.-butanol=11.8 wt. %, 1,1,1,-tris(hydroxymethyl)propane triacrylic acid ester=2.4 wt. %

Example F

Preparation of a DMC Catalyst with 1,1,1-tris (hydroxymethyl)propane-ethoxylate triacrylic acid ester (Catalyst F)

The process described in Example A was used except that 1,1,1-tris(hydroxymethyl)propane-ethoxylate (14:3 EO/OH) triacrylic acid ester with a molecular weight (number average) of ca. 912 (Sigma Aldrich Cliemie GmbH, D-89552 Steinheim) was used instead of the polyethylene glycol diacrylic acid ester of Example A.

Yield of dried, pulverulent catalyst: 6.1 g

Elementary analysis, thermogravimetric analysis and extraction: cobalt=10.9 wt. %, zinc=24.9 wt. %, tert.-butanol=5.1 wt. %, 1,1,1-tris(hydroxymethyl)propane-ethoxylate (14/3 EO/OH) triacrylic acid ester=5.7 wt. %

Example G

Preparation of a DMC Catalyst with 2-hydroxypropyl Methacrylate (Catalyst G)

The process described in Example A was used except that 2-hydroxypropyl methacrylate was used instead of the polyethylene glycol diacrylic acid ester of Example A.

Yield of dried, pulverulent catalyst: 4.9 g

Elementary analysis, thermogravimetric analysis and extraction: cobalt=12.4 wt. %, zinc=24.8 wt. %, tert.-butanol=11.7 wt. %, 2-hydroxypropyl methacrylate=9.1 wt. %

Example H (Comparison)

Preparation of a DMC Catalyst Without $\alpha,\beta$-unsaturated Carboxylic Acid Ester (Catalyst H, Synthesis According to JP-A 4 145 123)

A solution of 10 g (73.3 mmole) of zinc chloride in 15 ml of distilled water is added while stirring vigorously (24,000 revs/min) to a solution of 4 g (12 mmole) of potassium hexacyanocobaltate in 75 ml of distilled water. Immediately thereafter a mixture of 50 g of tert.-butanol and 50 g of distilled water is added to the suspension that is formed and the whole is then stirred vigorously (24,000 revs/min) for 10 minutes. The solids are removed by filtration, then stirred (10,000 revs/min) with 125 g of a mixture of tert.-butanol and distilled water (70:30; w/w), and refiltered. The product is next stirred (10,000 revs/min) for a further 10 minutes with 125 g of tert.-butanol. After filtration the catalyst is dried at 50° C. and under normal pressure to constant weight.

Yield of dried, pulverulent catalyst: 3.08 g

Elementary analysis: cobalt=13.6 wt. %, zinc=27.4 wt. %, tert.-butanol=14.2 wt. %

Production of Polyether Polyols

General Procedure 50 g of polypropylene glycol starter (number average molecular weight 1,000 g/mole) and 4.5 mg of catalyst (25 ppm, referred to the amount of the polyether polyol to be produced) are placed under a protective gas (argon) in a 500 ml capacity pressurised reactor and heated to 105° C. while stirring. Propylene oxide (ca. 5 g) is then added in one go until the total pressure has risen to 2.5 bar. Further propylene oxide is added only if a rapid fall in pressure in the reactor is observed. This rapid fall in pressure indicates that the catalyst is activated. The remaining propylene oxide (145 g) is then continuously metered in at a constant overall pressure of 2.5 bar. After complete addition of the propylene oxide and post-reaction time of 2 hours at 105° C., volatile fractions are distilled off at 90° C. (1 mbar) and the reactor is then cooled to room temperature.

The polyether polyols that are obtained were characterised by determining the OH numbers, double bond contents and viscosities.

The course of the reaction was followed by means of time-conversion curves (propylene oxide consumption [g] against reaction time [min]). The induction time was determined from the point of intersection of the tangent to the steepest point of the time-conversion curve with the extended baseline of the curve. The propoxylation times decisive as regards the catalyst activity correspond to the time between the catalyst activation (end of the induction period) and the end of the addition of the propylene oxide. The overall reaction time is the sum of the induction time and propoxylation time.

Example 1

Production of Polyether Polyol with Catalyst A (25 ppm)

| | | |
|---|---|---|
| Induction time: | | 87 min |
| Propoxylation time: | | 54 min |
| Overall reaction time: | | 141 min |
| Polyether polyol: | OH number (mg KOH/g): | 29.4 |
| | Double bond content (mmole/kg): | 8 |
| | Viscosity at 25° C. (mPas): | 836 |

Without removing the catalyst the metal content in the polyol is: Zn=6 ppm, Co=3 ppm.

Example 2

Production of Polyether Polyol with Catalyst B (25 ppm)

| | | |
|---|---|---|
| Induction time: | | 136 min |
| Propoxylation time: | | 98 min |
| Overall reaction time: | | 234 min |
| Polyether polyol: | OH number (mg KOH/g): | 31.3 |
| | Double bond content (mmole/kg): | 11 |
| | Viscosity at 25° C. (mPas): | 832 |

Example 3

Production of Polyether Polyol with Catalyst C (25 ppm)

| | | |
|---|---|---|
| Induction time: | | 151 min |
| Propoxylation time: | | 209 min |
| Overall reaction time: | | 360 min |
| Polyether polyol: | OH number (mg KOH/g): | 30.1 |
| | Double bond content (mmole/kg): | 8 |
| | Viscosity at 25° C. (mPas): | 937 |

Example 4

Production of Polyether Polyol with Catalyst D (25 ppm)

| | | |
|---|---|---|
| Induction time: | | 318 min |
| Propoxylation time: | | 511 min |
| Overall reaction time: | | 829 min |
| Polyether polyol: | OH number (mg KOH/g): | 30.0 |
| | Double bond content (mmole/kg): | 7 |
| | Viscosity at 25° C. (mPas): | 1060 |

Example 5

Production of Polyether Polyol with Catalyst E (25 ppm)

| | | |
|---|---|---|
| Induction time: | | 120 min |
| Propoxylation time: | | 87 min |
| Overall reaction time: | | 207 min |
| Polyether polyol: | OH number (mg KOH/g): | 29.8 |
| | Double bond content (mmole/kg): | 7 |
| | Viscosity at 25° C. (mPas): | 922 |

Example 6

Production of Polyether Polyol with Catalyst F (25 ppm)

| | |
|---|---|
| Induction time: | 88 min |
| Propoxylation time: | 99 min |
| Overall reaction time: | 187 min |

-continued

| Polyether polyol: | OH number (mg KOH/g): | 30.0 |
| --- | --- | --- |
| | Double bond content (mmole/kg): | 8 |
| | Viscosity at 25° C. (mPas): | 889 |

Example 7

Production of Polyether Polyol with Catalyst G (25 ppm)

| Induction time: | | 120 min |
| --- | --- | --- |
| Propoxylation time: | | 143 min |
| Overall reaction time: | | 265 min |
| Polyether polyol: | OH number (mg KOH/g): | 29.9 |
| | Double bond content (mmole/kg): | 7 |
| | Viscosity at 25° C. (mPas): | 990 |

Example 8 (Comparison)

Catalyst H (25 ppm) shows no activity under the afore-described reaction conditions even after 10 hours' induction time.

Examples 1–8 show that the new DMC catalysts according to the invention can, on account of their significantly higher activity, be used in such low concentrations in the production of polyether polyols that a separation of the catalyst from the polyol can be omitted.

What is claimed is:

1. A double metal cyanide catalyst comprising:
   a) at least one double metal cyanide compound;
   b) at least one organic complex ligand which is not a α,β-unsaturated carboxylic acid ester; and
   c) at least one α,β-unsaturated carboxylic acid ester.

2. The double metal cyanide catalyst according to claim 1, further comprising water and/or one or more water-soluble metal salts.

3. The double metal cyanide catalyst according to claim 1, wherein the double-metal cyanide compound is zinc hexacyanocobaltate (III).

4. The double metal cyanide catalyst according to claim 1, wherein the organic complex ligand is an alcohol, aldehyde, keytone, ether, ester, amide, urea, nitrile, sulfide and/or a mixture thereof.

5. The double metal cyanide catalyst according to claim 1, wherein the organic complex ligand is tert.-butanol.

6. The double metal cyanide catalyst according to claim 1, wherein the double metal cyanide catalyst contains up to about 80 wt. %, based on the total weight of the double metal cyanide catalyst, of a α,β-unsaturated carboxylic acid ester.

7. The double metal cyanide catalyst according to claim 1, wherein the α,β-unsaturated carboxylic acid ester is a polyethylene glycol acrylic acid ester, polyethylene glycol diacrylic acid ester, polyethylene glycol methacrylic acid ester, polyethylene glycol dimethacrylic acid ester, polypropylene glycol acrylic acid ester, polypropylene glycol diacrylic acid ester, polypropylene glycol methacrylic acid ester, polypropylene glycol dimethacrylic acid ester, 1,2,3-propanetriol diacrylic acid ester, 1,2,3-propanetriol dimethacrylic acid ester, 1,2,3-propanetriol triacrylic acid ester, 1,2,3-propanetriol-1,3-(2-hydroxypropoxylate)diacrylic acid ester, 1,2,3-propanetriol-propoxylate triacrylic acid ester, 1,4-butanediol acrylic acid ester, 1,4-butanediol dimethacrylic acid ester, 1,6-hexanediol diacrylic acid ester, 2-hydroxy-propyl methacrylic acid ester, 1,1,1-tris(hydroxymethyl)propane triacrylic acid ester, 1,1,1-tris(hydroxymethyl)propane-ethoxylate triacrylic acid ester, 1,1,1-tris(hydroxymethyl)propane-ethoxylate trimethacrylic acid ester, 1,1,1-tris(hydroxymethyl)propane-propoxylate triacrylic acid ester or 1,1,1-tris(hydroxymethyl)propane-propoxylate trimethacrylic acid ester.

8. A process for the preparation of a double metal cyanide catalyst comprising:
   (a) reacting, in aqueous solution, (i) at least one metal salt, (ii) with at least one metal cyanide salt, in the presence of (iii) an organic complex ligand which is not a α,β-unsaturated carboxylic acid ester, to form a suspension; (b) treating the suspension with at least one α,β-unsaturated carboxylic acid ester to form a double metal cyanide catalyst; (c) isolating the double metal cyanide catalyst from the suspension; (d) washing the double metal cyanide catalyst; and (e) drying the double metal cyanide catalyst.

9. In a process for the preparation of polyether polyols by the polyaddition of alkylene oxides onto starter compounds containing active hydrogen atoms, in which the alkylene oxides are contacted with the starter compounds, the improvement wherein the polyether polyols are prepared in the presence of the double metal cyanide catalysts of claim 1.

* * * * *